(12) United States Patent
Bradley

(10) Patent No.: US 8,316,575 B2
(45) Date of Patent: Nov. 27, 2012

(54) SWIVEL MOUNT FOR BIRD-SHAPED DECOYS

(76) Inventor: Gerald R. Bradley, Scurry, TX (US)

( * ) Notice: Subject to any disclaimer, the term of this patent is extended or adjusted under 35 U.S.C. 154(b) by 325 days.

(21) Appl. No.: 12/404,018

(22) Filed: Mar. 13, 2009

(65) Prior Publication Data

US 2009/0229164 A1  Sep. 17, 2009

Related U.S. Application Data

(60) Provisional application No. 61/036,805, filed on Mar. 14, 2008.

(51) Int. Cl.
*A01M 31/06* (2006.01)
(52) U.S. Cl. .................................. 43/2; 43/3
(58) Field of Classification Search ............... 43/2, 3; 40/417, 493; 446/259, 264, 325, 326, 396
See application file for complete search history.

(56) References Cited

U.S. PATENT DOCUMENTS

| | | | | |
|---|---|---|---|---|
| 364,573 A * | 6/1887 | Brinkop | | 43/3 |
| 507,381 A * | 10/1893 | Newton | | 40/417 |
| 624,639 A * | 5/1899 | Frazee et al. | | 446/326 |
| 740,293 A * | 9/1903 | Loeble | | 43/3 |
| 957,750 A * | 5/1910 | Cunningham | | 43/3 |
| 1,066,587 A * | 7/1913 | Cunningham | | 43/3 |
| 1,235,050 A * | 7/1917 | Pajeau | | 446/326 |
| 1,329,044 A * | 1/1920 | Farnam | | 40/417 |
| 1,566,724 A * | 12/1925 | Bates | | 40/417 |
| 1,831,286 A * | 11/1931 | Chelini | | 43/3 |
| 1,851,223 A * | 3/1932 | Watanabe | | 446/396 |
| 2,441,753 A * | 5/1948 | Carpenter | | 43/3 |
| 2,478,585 A * | 8/1949 | Kouba | | 43/3 |
| 2,536,736 A * | 1/1951 | Gazalski | | 43/3 |
| 2,704,908 A * | 3/1955 | Lamkin | | 40/417 |
| 2,711,608 A * | 6/1955 | Fulster | | 43/3 |
| 2,723,480 A * | 11/1955 | Candy | | 43/3 |
| 2,787,074 A * | 4/1957 | Miller | | 43/3 |
| 2,857,623 A * | 10/1958 | Clark | | 43/3 |
| 2,884,729 A * | 5/1959 | Walton | | 43/2 |
| 3,269,055 A * | 8/1966 | Gordon | | 446/259 |
| 3,335,519 A * | 8/1967 | Elward | | 446/264 |
| 3,623,239 A * | 11/1971 | Maslokovets | | 446/259 |
| 3,800,457 A * | 4/1974 | Barrett | | 43/3 |
| 4,432,158 A * | 2/1984 | Nicholas | | 446/325 |
| 4,579,281 A * | 4/1986 | Karterman | | 446/200 |
| 4,651,457 A * | 3/1987 | Nelson et al. | | 43/3 |
| 4,893,428 A * | 1/1990 | Gagnon, Sr. | | 43/3 |
| 5,003,722 A * | 4/1991 | Berkley et al. | | 43/3 |
| 5,172,506 A * | 12/1992 | Tiley et al. | | 43/3 |
| 5,392,554 A * | 2/1995 | Farstad et al. | | 43/3 |

(Continued)

FOREIGN PATENT DOCUMENTS

EP   1179296 A2 *   2/2002

(Continued)

*Primary Examiner* — Darren W Ark
(74) *Attorney, Agent, or Firm* — Kirby B. Drake; Klemchuk Kubasta LLP

(57) ABSTRACT

A bird-shaped decoy is supported on a swivel that is supported on a tubular component which allows the decoy to rotate. A bird-shaped decoy is mounted on a first swivel and a second swivel is mounted on a tubular component. An offset support rod connects the two swivels allowing the decoy to simultaneously orbit or rotate. The tubular component mounted swivel can have multiple support rods mounted thereon each extending to a swivel that supports a bird-shaped decoy.

9 Claims, 11 Drawing Sheets

U.S. PATENT DOCUMENTS

| | | | | |
|---|---|---|---|---|
| 5,515,637 | A * | 5/1996 | Johnson | 43/2 |
| 5,930,936 | A * | 8/1999 | Parr et al. | 43/3 |
| 6,092,322 | A * | 7/2000 | Samaras | 43/2 |
| 6,092,323 | A * | 7/2000 | McBride et al. | 43/3 |
| 6,216,382 | B1 * | 4/2001 | Lindaman | 43/2 |
| 6,266,912 | B1 * | 7/2001 | Jirele | 43/3 |
| 6,360,474 | B1 * | 3/2002 | Wurlitzer | 43/3 |
| 6,408,559 | B2 * | 6/2002 | Mathews | 43/2 |
| 6,442,884 | B1 * | 9/2002 | Sceery | 43/3 |
| 6,449,894 | B1 * | 9/2002 | Price et al. | 43/3 |
| 6,481,147 | B2 * | 11/2002 | Lindaman | 43/2 |
| 6,484,431 | B2 * | 11/2002 | Price et al. | 43/3 |
| 6,487,810 | B1 * | 12/2002 | Loughman | 43/2 |
| 6,493,980 | B1 * | 12/2002 | Richardson et al. | 43/3 |
| 6,508,028 | B1 * | 1/2003 | Crowe | 43/3 |
| 6,574,904 | B1 * | 6/2003 | Fencel et al. | 43/3 |
| 6,583,368 | B2 * | 6/2003 | Pivinski | 446/396 |
| 6,698,132 | B1 * | 3/2004 | Brint | 43/3 |
| 6,733,358 | B1 * | 5/2004 | Wuest | 446/396 |
| 6,745,510 | B1 * | 6/2004 | Coker | 43/3 |
| 6,775,943 | B2 * | 8/2004 | Loughman | 43/3 |
| 6,901,693 | B1 * | 6/2005 | Crowe | 43/2 |
| 6,907,688 | B2 * | 6/2005 | Brint | 43/2 |
| 7,028,429 | B1 * | 4/2006 | Druliner | 43/3 |
| 7,137,221 | B2 * | 11/2006 | Highby et al. | 43/2 |
| 7,326,101 | B2 * | 2/2008 | Engel et al. | 446/325 |
| 7,434,347 | B1 * | 10/2008 | Powell | 43/3 |
| 7,536,823 | B2 * | 5/2009 | Brint | 43/3 |
| 7,562,487 | B2 * | 7/2009 | Barr | 43/2 |
| 7,631,456 | B2 * | 12/2009 | Butz | 43/3 |
| 7,694,451 | B1 * | 4/2010 | Zink, Jr. | 43/3 |
| 7,716,866 | B2 * | 5/2010 | Zink et al. | 43/3 |
| 7,784,213 | B1 * | 8/2010 | Primos | 43/2 |
| 7,966,963 | B1 * | 6/2011 | Caldwell et al. | 43/2 |
| 8,082,689 | B2 * | 12/2011 | Eggleston | 43/3 |
| 8,151,512 | B2 * | 4/2012 | Latschaw | 43/3 |
| 2002/0162268 | A1 * | 11/2002 | Fulcher | 43/3 |
| 2003/0196367 | A1 * | 10/2003 | Powell | 43/3 |
| 2003/0208944 | A1 * | 11/2003 | Olson et al. | 43/3 |
| 2005/0223615 | A1 * | 10/2005 | Fencel et al. | 43/3 |
| 2006/0053675 | A1 * | 3/2006 | Lindaman | 43/2 |
| 2006/0143969 | A1 * | 7/2006 | Lindaman | 43/2 |
| 2007/0251135 | A1 * | 11/2007 | Watlov et al. | 43/3 |
| 2008/0172920 | A1 * | 7/2008 | Brint et al. | 43/2 |
| 2008/0209792 | A1 * | 9/2008 | Watlov | 43/3 |
| 2008/0216382 | A1 * | 9/2008 | Rohrke | 43/2 |
| 2009/0007479 | A1 * | 1/2009 | Jerome, Sr. | 43/2 |
| 2009/0229163 | A1 * | 9/2009 | Latschaw | 43/2 |
| 2009/0235571 | A1 * | 9/2009 | Wyant et al. | 43/2 |
| 2009/0260274 | A1 * | 10/2009 | Rogers | 43/2 |
| 2010/0064569 | A1 * | 3/2010 | Wyant | 43/2 |
| 2010/0115818 | A1 * | 5/2010 | Rogers | 43/2 |
| 2010/0180486 | A1 * | 7/2010 | Jaeger | 43/3 |
| 2010/0275499 | A1 * | 11/2010 | Eggleston | 43/3 |

FOREIGN PATENT DOCUMENTS

| | | |
|---|---|---|
| EP | 1279333 A2 * | 1/2003 |
| FR | 2671693 A1 * | 7/1992 |
| FR | 2671694 A1 * | 7/1992 |
| GB | 2067064 A * | 7/1981 |
| GB | 2131266 A * | 6/1984 |
| GB | 2189124 A * | 10/1987 |
| GB | 2295953 A * | 6/1996 |

* cited by examiner

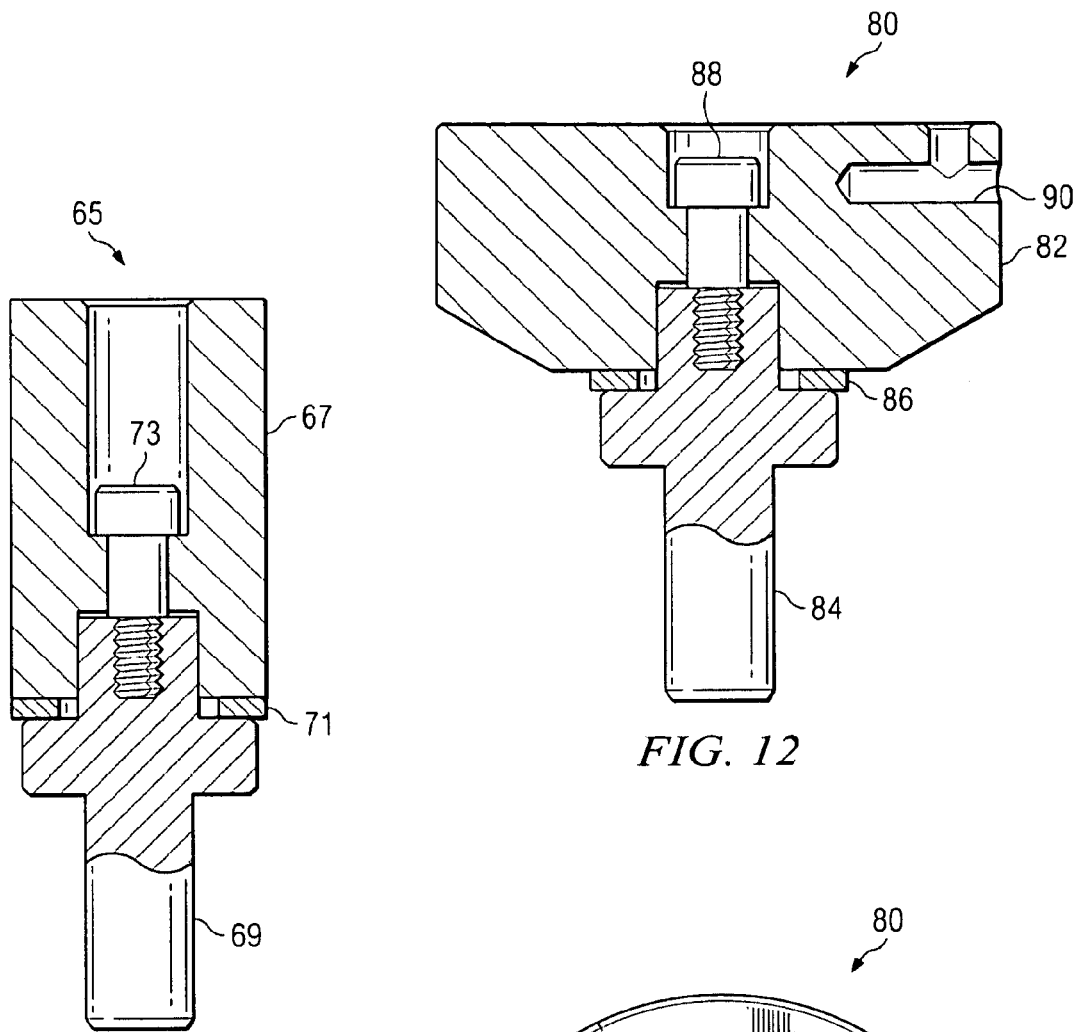
FIG. 11
FIG. 12
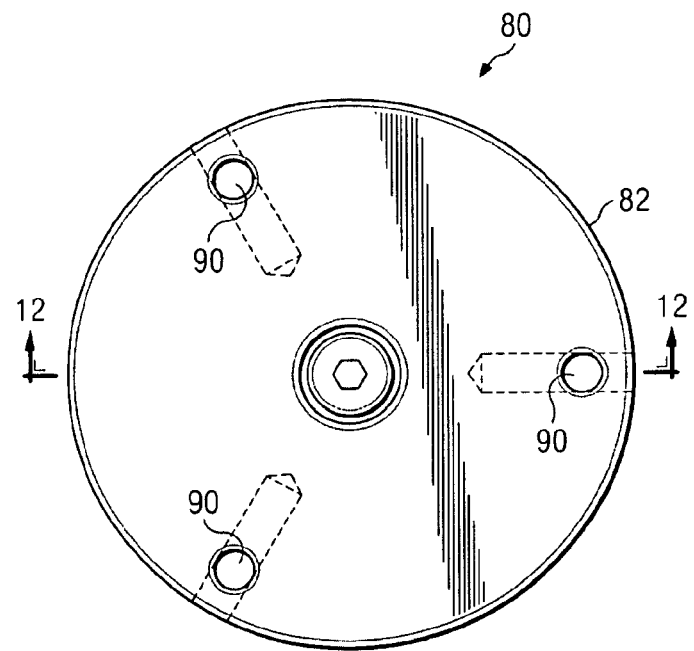
FIG. 13

SWIVEL MOUNT FOR BIRD-SHAPED DECOYS

CROSS-REFERENCE TO RELATED APPLICATION

Applicant(s) claims priority based on U.S. Provisional Patent Application No. 61/036,805 filed Mar. 14, 2008, the entire content of which is incorporated herein by reference.

DESCRIPTION OF THE DRAWINGS

FIG. 11 is a cross-sectional view illustrating an alternative swivel which may be utilized in lieu of the swivel shown in FIG. 6;

FIG. 12 is a sectional view of a swivel which may be utilized in lieu of the swivel shown in FIG. 3 to simultaneously support three dove decoys;

FIG. 13 is a top view of the swivel of FIG. 12;

DETAILED DESCRIPTION

Figure 1:
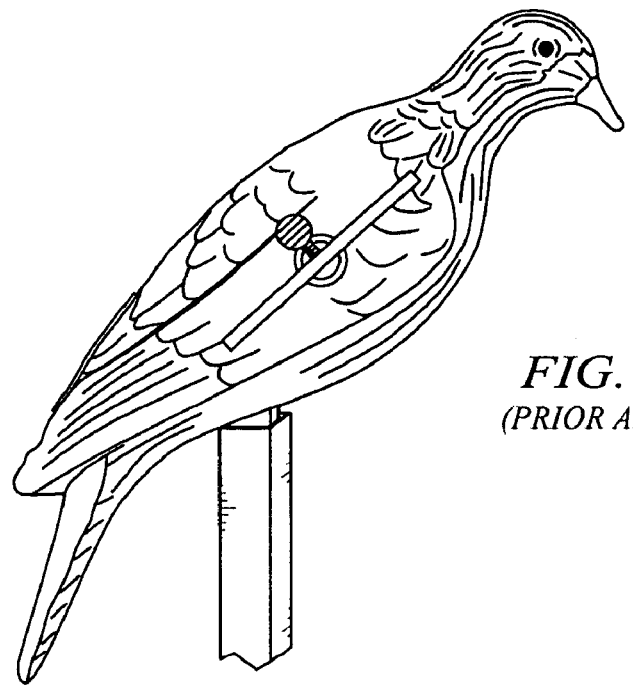
FIG. 1 is a right side view of a first prior art decoy.
Figure 2:
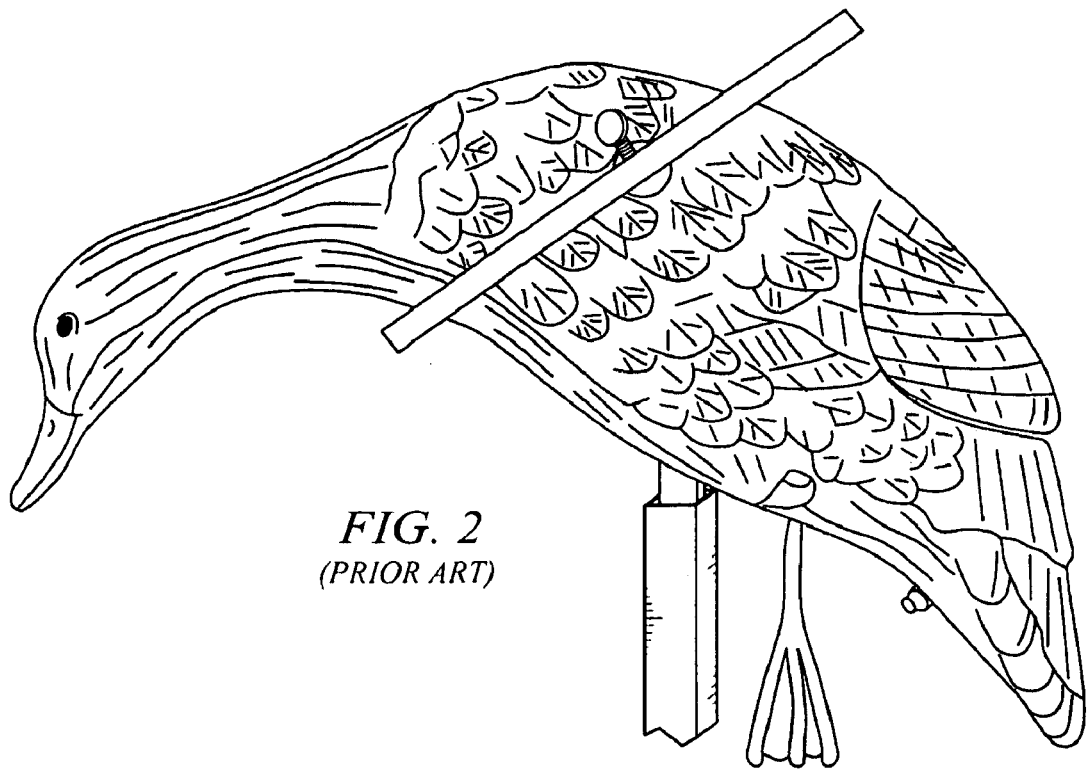
FIG. 2 is a left side view of a second prior art decoy.

Referring to the drawings and in particular FIG. 1 thereof a prior art dove decoy system is shown, such as the MOJO Dove™ sold by HUNTWISE, Inc. d/b/a MOJO Outdoors®. FIG. 2 shows a prior art duck decoy system such as the Super MOJO Mallard®, MOJO Mallard®, or Baby MOJO™, all sold by MOJO Outdoors®. Although not shown in the drawings, it should be understood that embodiments of the invention shown and described herein are compatible for use with other decoys and decoy systems sold by MOJO Outdoors®. The embodiment shown in FIG. 3 is compatible with the decoy system depicted in FIG. 4 and vice versa.

It should also be understood that the various embodiments of the present invention are compatible for use with various types and kinds of decoys and decoy systems that are manufactured and/or sold by entities other than MOJO Outdoors®. Decoys and like systems compatible with the embodiments of the present invention will be readily apparent to those having skill in the art.

Figure 3:
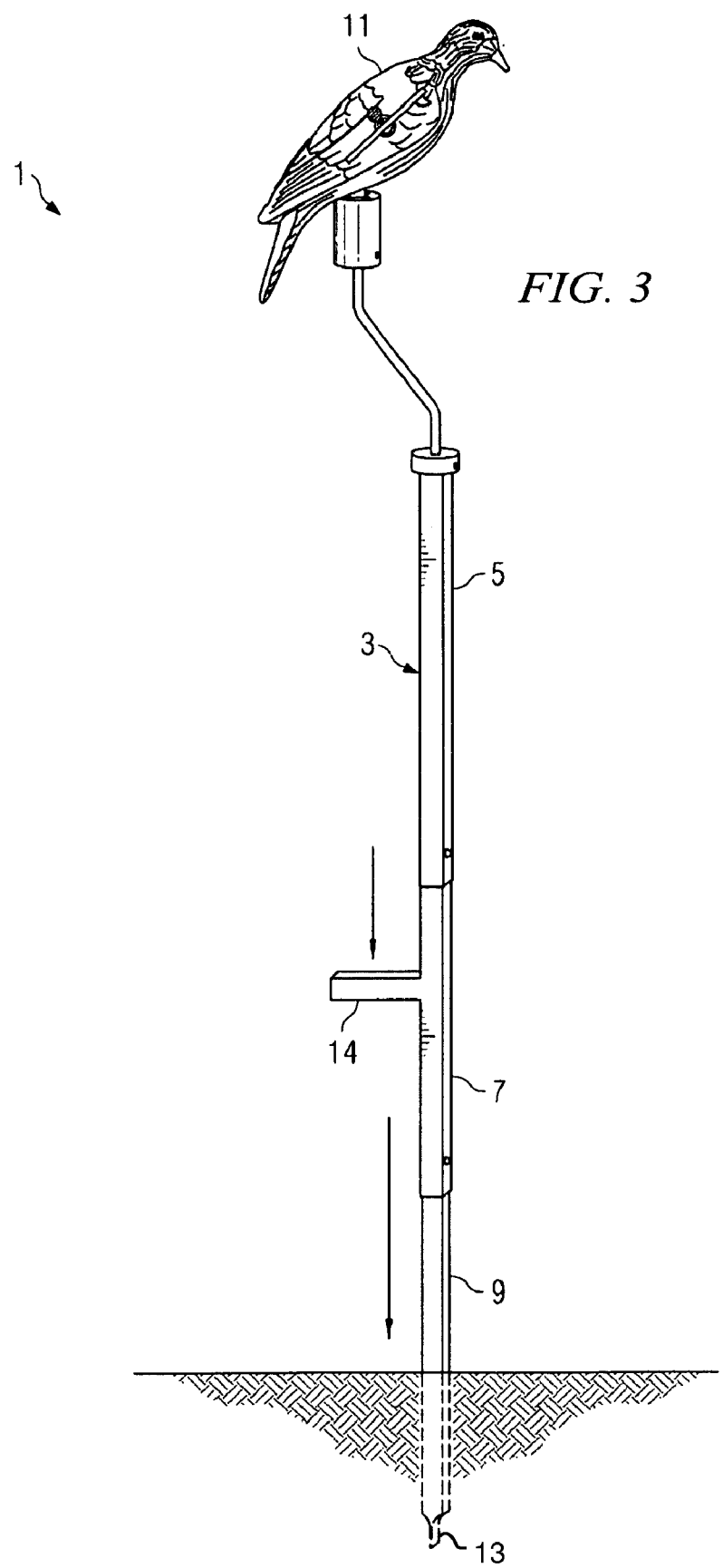
FIG. 3 is an elevational view of a first embodiment of the present invention in use with the first prior art decoy.
Figures 7, 8:
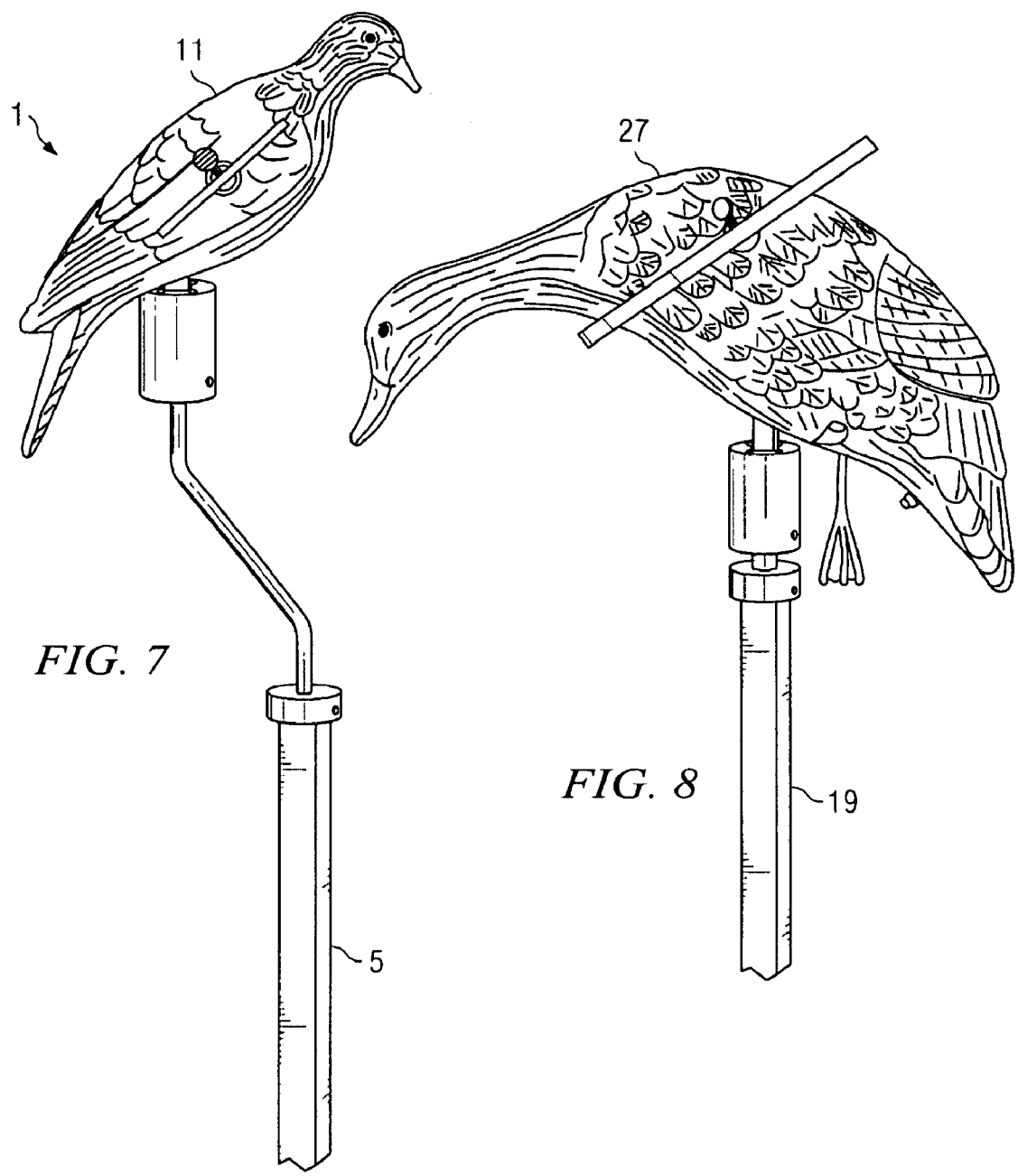
FIG. 7 is an elevational view of the first embodiment of the present invention in use with the first prior art decoy.
FIG. 8 is an elevational view of the second embodiment of the present invention in use with the second prior art decoy.

Referring to FIGS. 3 and 7 an embodiment of the present invention is shown in use with a prior art dove decoy system 1 such as the MOJO Dove™. The prior art decoy system 1 comprises a tubular component 3 further comprising tubular members 5, 7 and 9 and a decoy 11. Tubular members 5, 7 and 9 are designed to be inserted into each other and held in place via pin mechanisms to form the tubular component 3. Tubular member 9 has a tapered end 13 which enables the decoy system 1 to be inserted into the earth using an arm portion 14 of tubular member 7 to drive the tapered end 13 into the earth.

Figure 4:
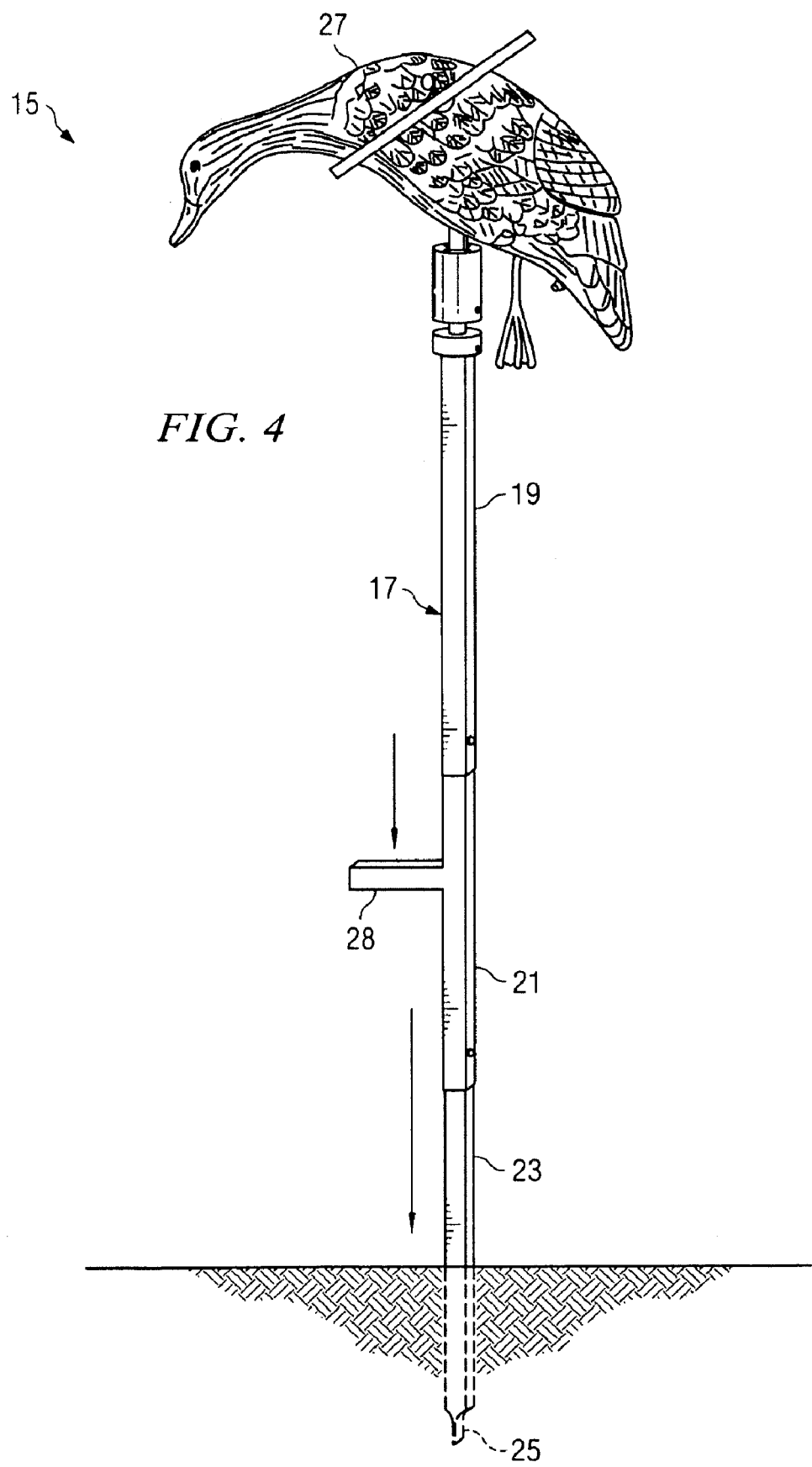
FIG. 4 is an elevational view of a second embodiment of the present invention in use with the second prior art decoy.

Referring to FIGS. 4 and 8 an embodiment of the present invention is shown in use with a prior art duck decoy system 15 such as the Super MOJO Mallard®, MOJO Mallard®, or Baby MOJO™. The prior art decoy system 15 comprises a tubular component 17 further comprising tubular members 19, 21 and 23 and a decoy 27. Tubular members 19, 21 and 23 are designed to be inserted into each other and held in place via pin mechanisms to form the tubular component 17. Tubular member 21 has a tapered end 25 which enables the decoy system 15 to be forced into the earth using an arm portion 28 of tubular member 21 to drive the tapered end 25 into the earth.

Figure 5:
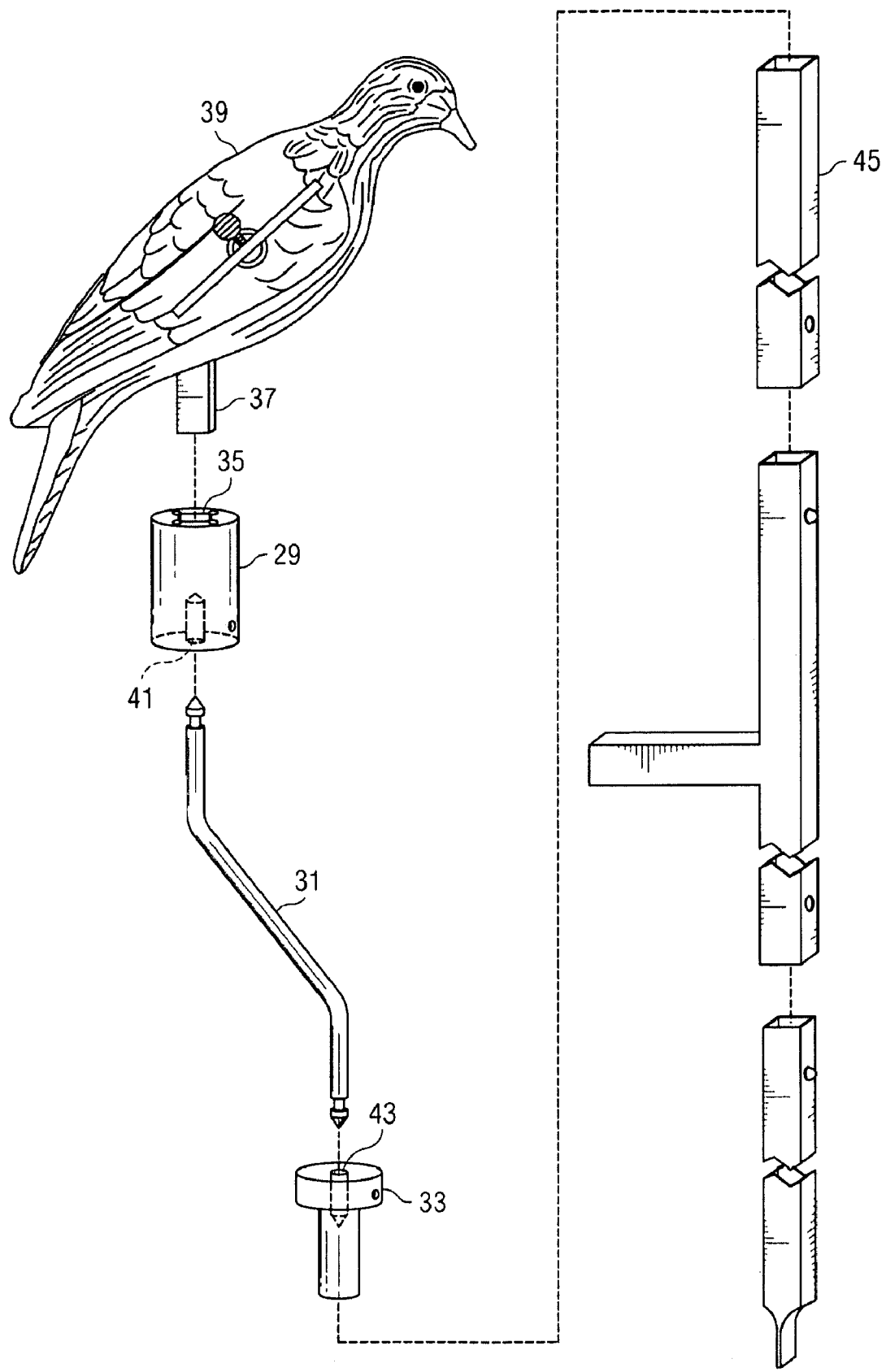
FIG. 5 is an exploded view of the first embodiment of the present invention.

FIG. 5 is an exploded view of one embodiment of the present invention. This embodiment comprises a first bearing 29, a pin member 31 and a second bearing 33.

At its top end first bearing 29 is disposed with an aperture 35 for receiving a tubular portion 37 of a decoy 39 of a decoy system. Alternative embodiments of the first bearing 29 will have alternatively shaped apertures 35 that receive decoys having alternatively shaped tubular portions. In another embodiment the first bearing 29 and the tubular portion 37 of the decoy 39 are further held in place via a pin or other such mechanism, such means of attachment being well known to those having skill in the art.

At its bottom end first bearing 29 is disposed with a seat 41 which engages one end of the pin member 31. The respective ends of pin member 31 are offset. Similarly, the top end of second bearing 33 is disposed with a seat 43 which engages the other end of pin member 31. The seat of first bearing 29 and the seat of second bearing 33 may have larger included angles than the top and bottom ends of pin member 31. This may maintain a centerline between the decoy and the pin member and the tubular member and the pin member with minimal resistance between surfaces forming the included angles.

The bottom end of second bearing 33 is configured to engage a tubular member 45 of a decoy system. In one embodiment the bottom end of second bearing 33 is inserted into the top end of the tubular member 45. In an alternative embodiment the top end of tubular member 45 is inserted into the bottom end of second bearing 33. In another embodiment the second bearing 33 and the tubular member 45 are further held in place via a pin or other such mechanism, such means of attachment being well known to those having skill in the art. Alternative embodiments of the second bearing 33 will have alternatively shaped bottom ends that engage decoy systems having alternatively shaped tubular portions.

Alternative embodiments of first bearing 29 and second bearing 33 will have alternatively shaped seats 41 and 43 respectively that engage pin members having alternatively shaped ends. Alternative first bearing 29 and second bearing 33, pin members and means of creating the connections between the first bearing 29 and second bearing 33 and the pin members will be well known to those having skill in the art.

In an alternative embodiment the placement of the seats 41 and 43 of first bearing 29 and second bearing 33 and the respective ends of the pin member 31 are reversed so that the pin member 31 has a seat at each end and the first bearing 29 and second bearing 33 have pin portions extending therefrom capable of engaging the seats of the pin member 31.

Figure 9:
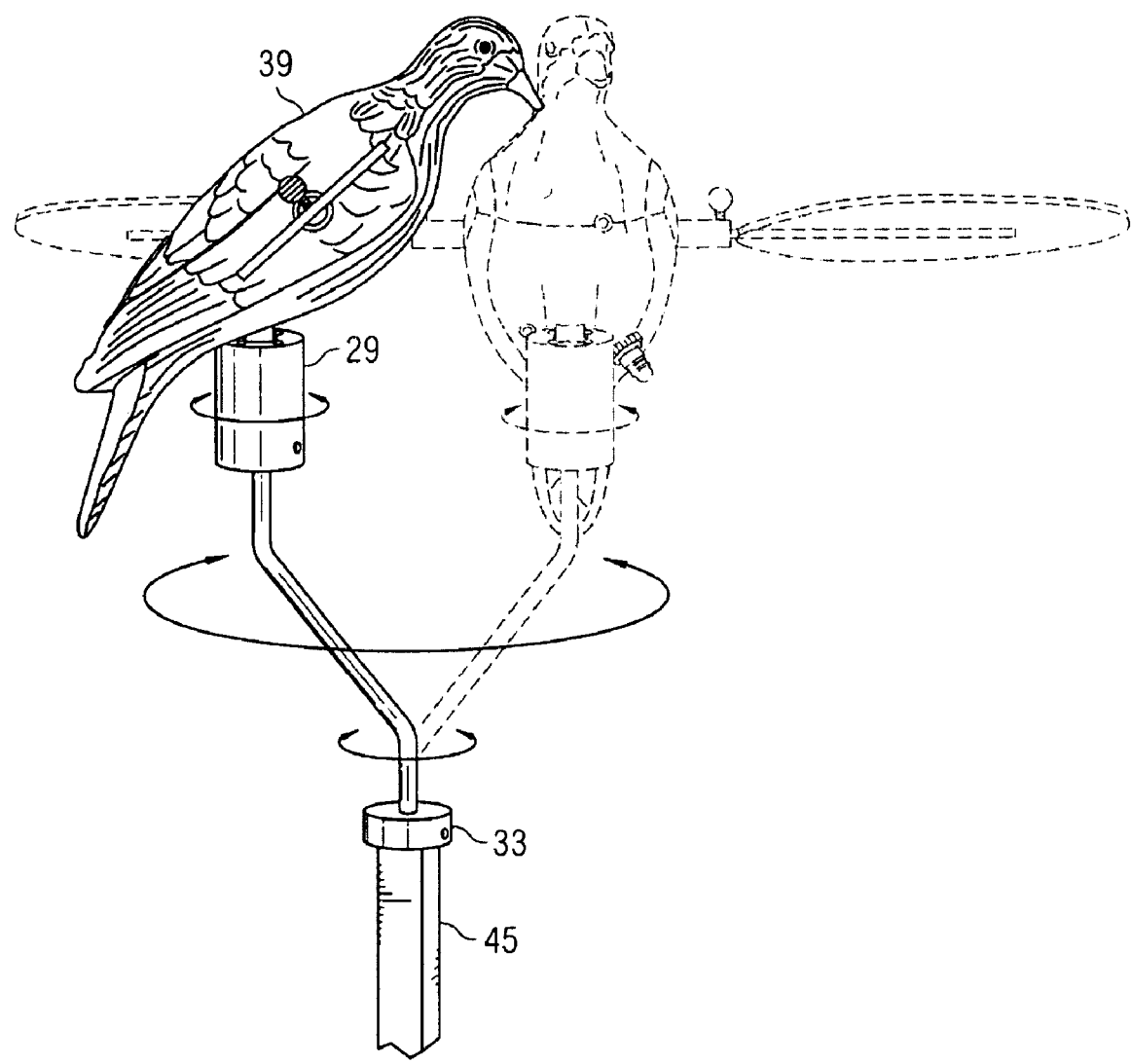
FIG. 9 comprises elevational and frontal views of the first embodiment of the present invention with the frontal portion of the figure shown in phantom.

Referring to FIG. 9 rotational movement of the decoy 39 at first bearing 29 and second bearing 33 is shown. The rotational movement of the decoy 39 about first bearing 29 and second bearing 33 is relative to the tubular component 45. In one embodiment rotational movement of the decoy 39 is caused by the wind. Rotation of the decoy 39 can also be effected by means of a battery powered motor.

Figure 6:
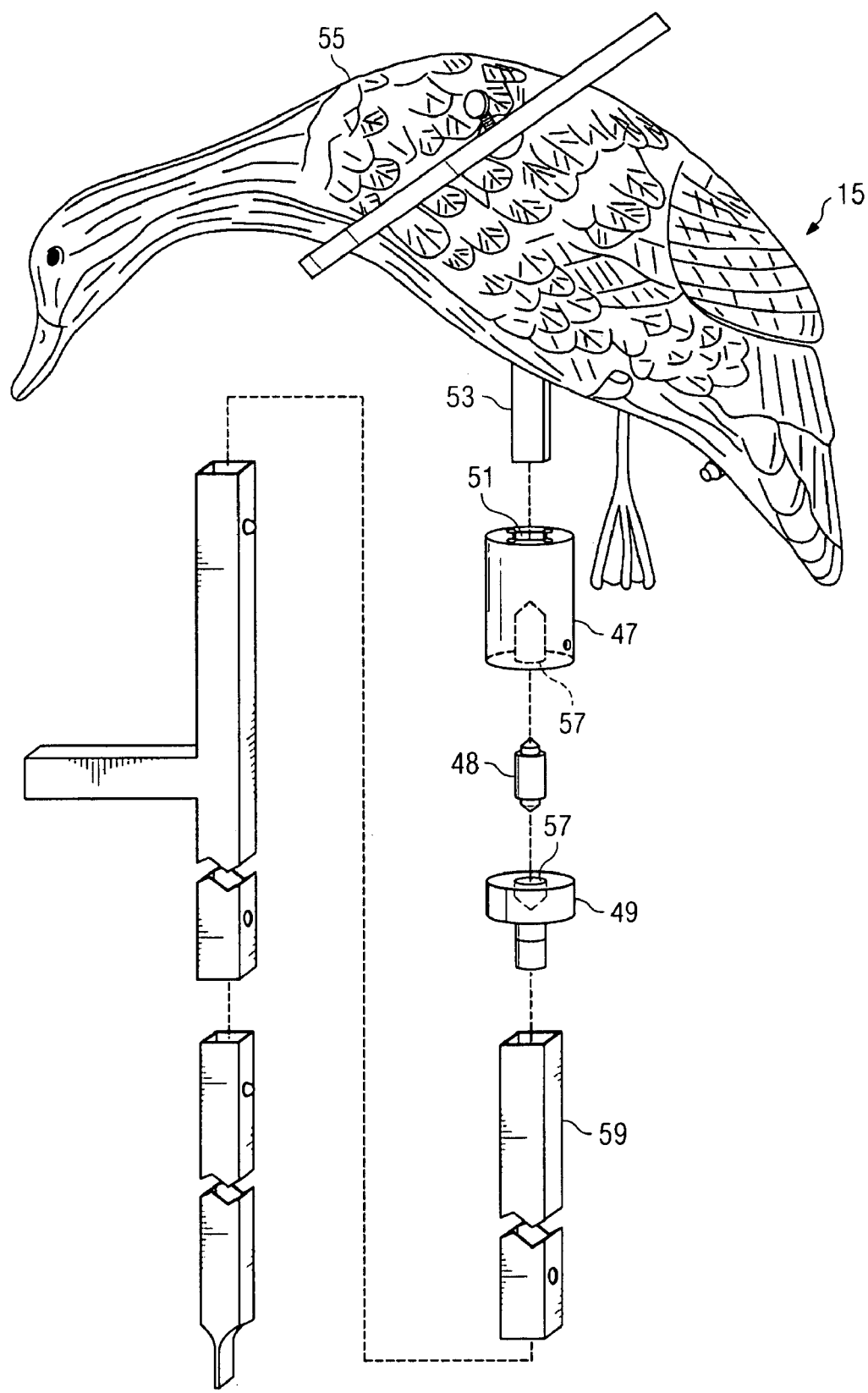
FIG. 6 is an exploded view of the second embodiment of the present invention.

Referring now to FIG. 6 an exploded view of another embodiment of the invention is shown. This embodiment comprises bearings 47 and 49 and pin member 48.

At its top end bearing 47 is disposed with an aperture 51 capable of engaging a tubular portion 53 of a decoy 55 of a decoy system. Alternative embodiments of the bearing 47 will have alternatively shaped apertures 51 that engage decoys having alternatively shaped tubular portions. In another embodiment the bearing 47 and the tubular portion 53 of the decoy 55 are further held in place via a pin or other such mechanism, such means of attachment being well known to those having skill in the art.

At its bottom end bearing 47 is disposed with a seat 57 which engages one end of the pin member 48. The other end of the pin member 48 is configured to engage a bearing 49. In one embodiment the bottom end of bearing 49 is inserted into the top end of tubular member 59. In an alternative embodiment the top end of tubular member 59 is inserted into the bottom end of bearing 49. In another embodiment the bearing 49 and the tubular member 59 are further held in place via a pin or other such mechanism, such means of attachment being well known to those having skill in the art. Alternative embodiments of the pin member 48 will have alternatively shaped bottom ends that engage decoy systems having alternatively shaped tubular portions.

Alternative embodiments of bearing 49 will have alternatively shaped seats 57 that engage pin members having alternatively shaped ends. Alternative bearings, pin members and means of creating the connection between the bearings 47 and 49 and the pin member 48 will be well known to those having skill in the art.

In an alternative embodiment the placement of the seat 57 of bearing 47 and the respective end of pin member 48 are reversed so that the end of pin member 48 is disposed at the bottom end of first bearing 47 and the seat of first bearing 47 is disposed at pin member 48.

Figure 10:
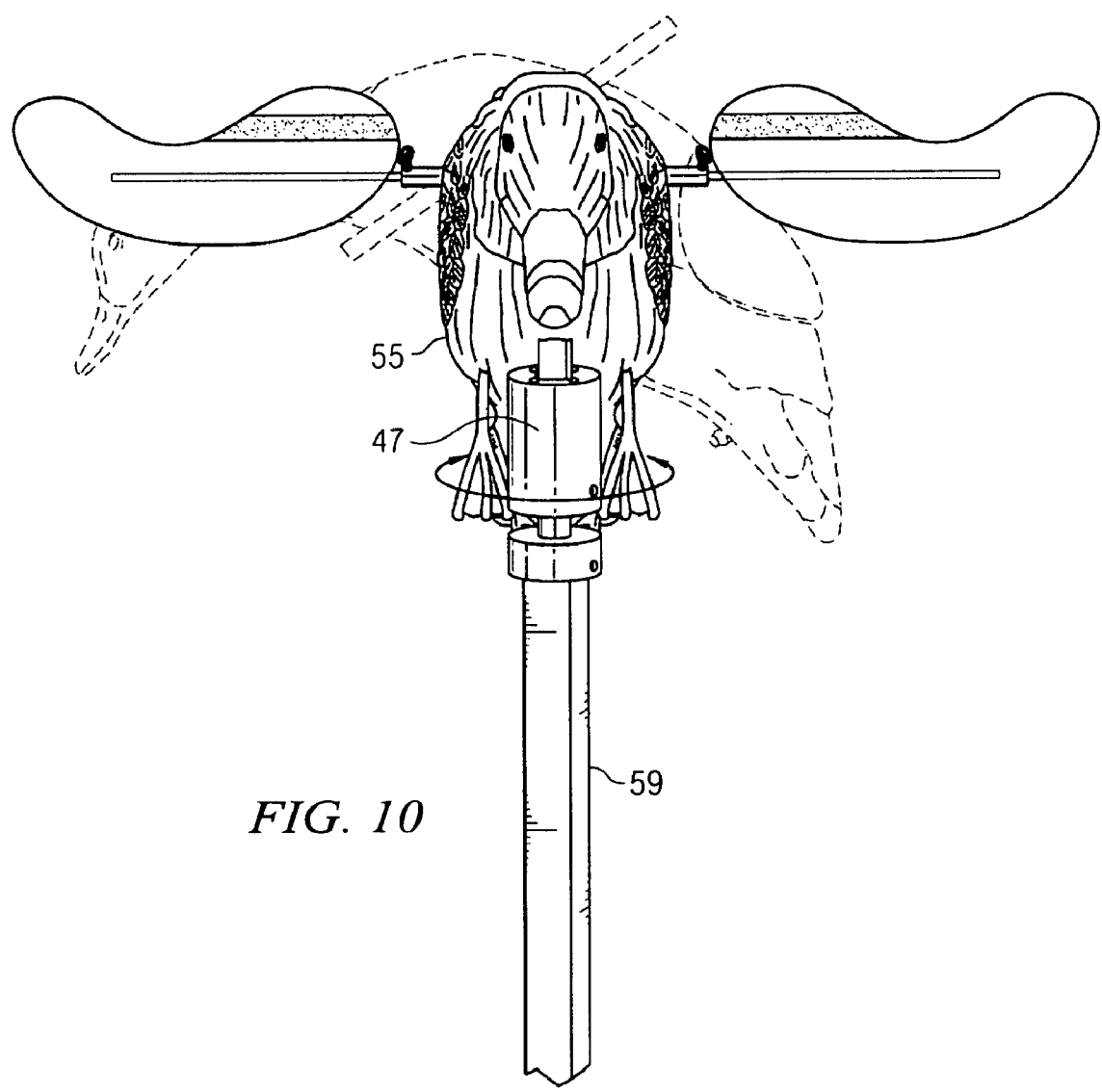
FIG. 10 comprises elevational and frontal views of the second embodiment of the present invention with the elevational portion of the figure shown in phantom.

Referring to FIG. 10 rotational movement of the decoy 55 at bearing 47 is shown. The rotational movement of the decoy 55 about bearing 47 is relative to the tubular component 59. In one embodiment rotational movement of the decoy 55 is caused by the wind. Rotation of the decoy 55 can also be effected by means of a battery powered motor.

FIG. 11 is a cross sectional view of a swivel 65 which may be used in lieu of the bearing 47 to support the duck decoy 55 as shown in FIGS. 8 and 10. The swivel 65 comprises a mount 67, an axle 69, a thrust washer 71 and a shoulder bolt 73.

FIG. 12 is cross sectional view illustrating a swivel 80 which may be used in lieu of the bearing 29 shown in FIGS. 5 and 9 to support a plurality of dove decoys. The swivel 80 comprises a mount 82, an axle 84, a thrust washer 86 and a shoulder bolt 88.

FIG. 13 is a top view of the swivel 80 illustrating three apertures 90 that receive pins (not shown in FIG. 13) which in turn support dove decoys.

Figure 14:
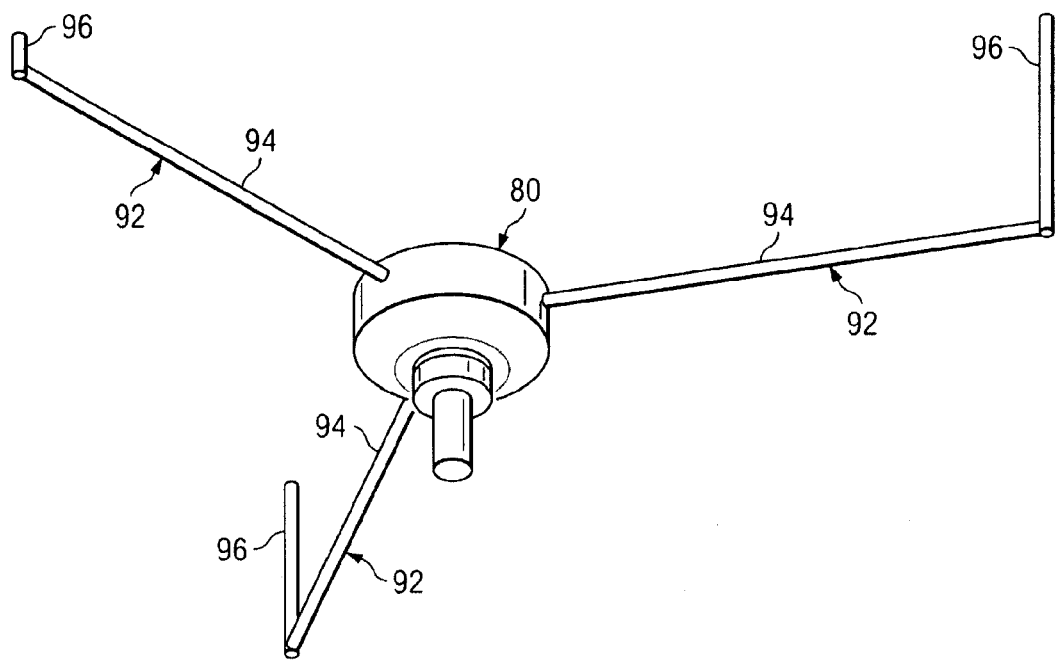
FIG. 14 is perspective view of the swivel of FIG. 12 showing the swivel with decoy supporting arms secured thereto.
Figure 15:
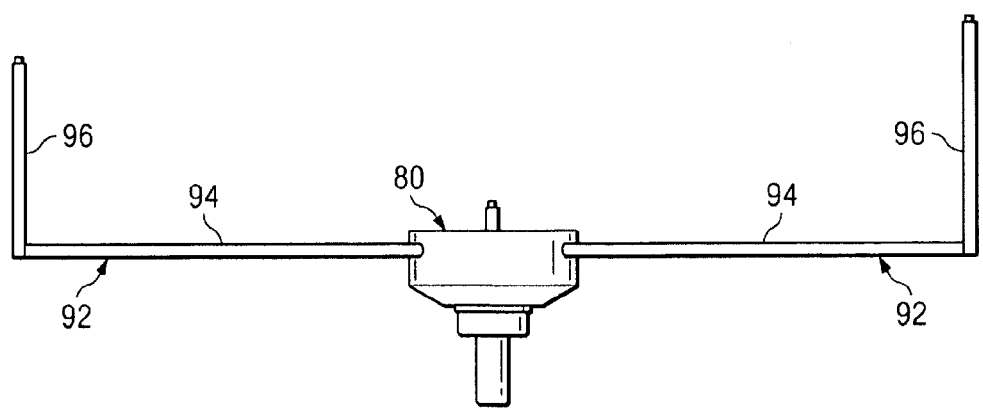
FIG. 15 is a front view of the swivel of FIG. 12 having decoy supporting arms secured thereto.

FIGS. 14 and 15 illustrate the swivel 80 having three pins 92 extending outwardly therefrom at equally spaced intervals. Each pin 92 comprises a nominally horizontally disposed section 94 extending outwardly from the swivel 80 and a nominally vertically disposed section 96 extending upwardly from the distal end of the section 94.

Figure 16:
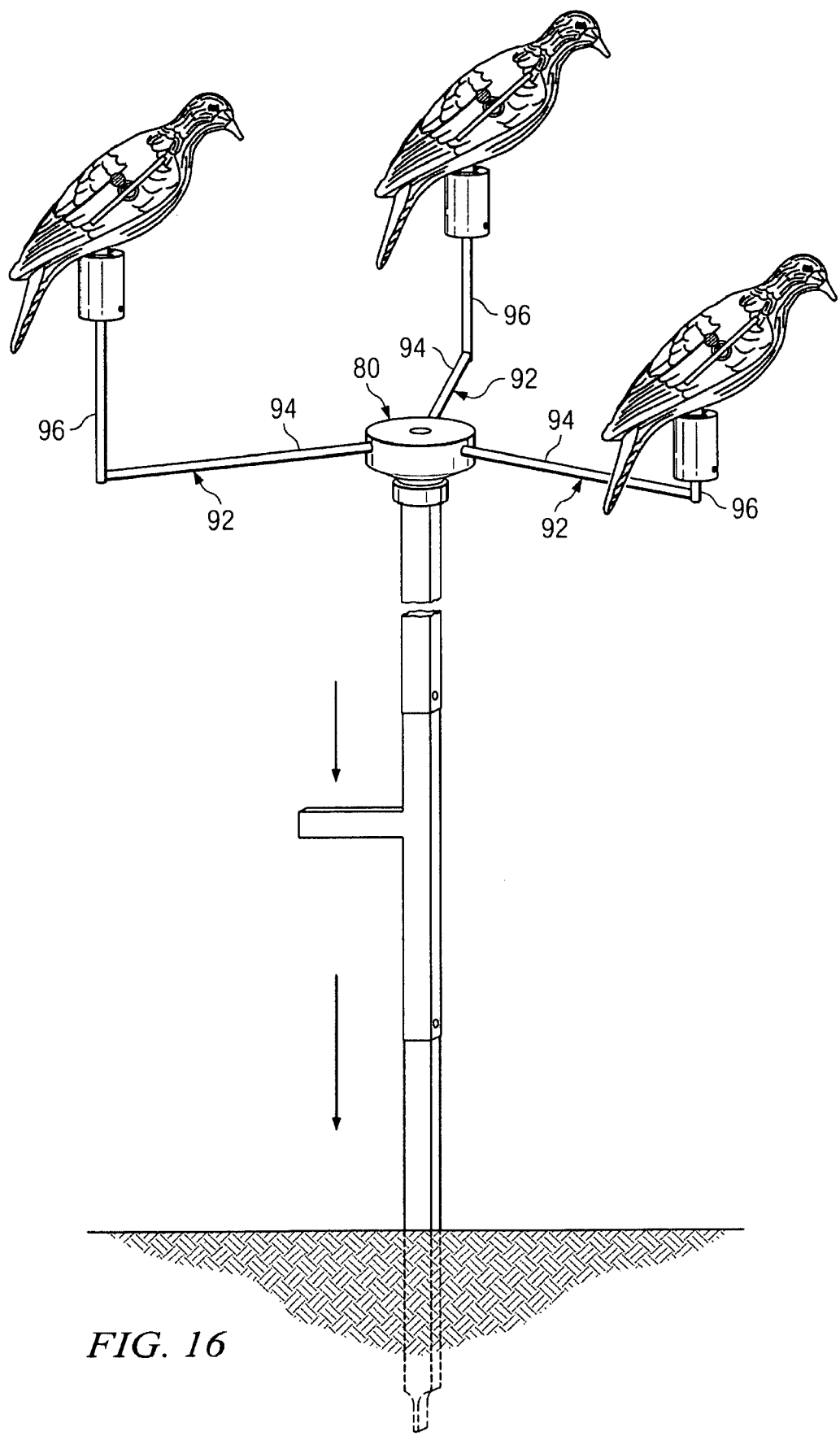
FIG. 16 is a perspective view of the swivel of FIG. 12 showing three dove decoys supported by arms which are in turn supported by the swivel.

FIG. 16 illustrates the swivel 80 in use to support three dove decoys 100 which are supported on the vertical sections 96 of the pins 92 by swivels 102. The swivels 102 may be substantially identical in construction and function to the bearing 29 illustrated in FIGS. 5 and 9 and described hereinabove in conjunction herewith.

Those skilled in the art will appreciate the fact that the use of the swivel 80 to support the dove decoys 100 allows the decoys to orbit about the axis of the swivel 80 while simultaneously pivoting about the axis defined by the swivels 102. Orbital and pivotal movement of the decoys typically occurs in response to the wind. Orbital and pivotal movement of the decoys 100 can also be achieved by means of battery operated motors.

The present invention has been described above in conjunction with products of MOJO Outdoors®. It will be understood, however, that the invention can be adapted for use with products of other manufacturers. In such case the invention may be modified for use with support structures other than the tubular components shown in the drawings.

Although preferred embodiments of the invention have been illustrated in the accompanying Drawings and described in the foregoing Detailed Description, it will be understood that the invention is not limited to the embodiments disclosed, but is capable of numerous rearrangements, modifications and substitutions of parts and elements without departing from the spirit of the invention.

The invention claimed is:

1. For use in conjunction with a bird-shaped decoy and a tubular member for supporting the decoy above the earth, the improvement comprising:

a first bearing connected to a bottom of the decoy, said first bearing disposed with a first seat that engages a top end of a pin member; and a second bearing supported on the tubular member, said second bearing having a second seat positioned at a top end of said second bearing that engages a bottom end of said pin member, wherein said first seat and said second seat have larger included angles than said top and said bottom ends of said pin member to maintain a centerline between the decoy and the pin member and the tubular member and the pin member with minimal resistance between surfaces forming the included angles.

2. The improvement according to claim 1, wherein the bird-shaped decoy is a duck decoy.

3. The improvement according to claim 1, wherein a top end of said tubular member is inserted into a bottom end of said second bearing.

4. The improvement according to claim 1, wherein a bottom end of said second bearing is inserted into a top end of said tubular member.

5. The improvement according to claim 1, wherein rotational movement of said first bearing relative to a centerline of the top end of the pin member and the bottom end of the pin member relative to a centerline of the second bearing is caused by the wind.

6. The improvement according to claim 1, wherein said first bearing swivels freely of said second bearing.

7. The improvement according to claim 1, wherein a top end of said first bearing is disposed with an aperture for receiving said decoy.

8. The improvement according to claim 1, wherein said top end and said bottom end of said pin member are laterally offset.

9. The improvement according to claim 1, wherein said bird-shaped decoy is a dove decoy.

* * * * *